United States Patent [19]
Kocer et al.

[11] Patent Number: 6,098,437
[45] Date of Patent: Aug. 8, 2000

[54] HYDROFORMED CONTROL ARM

[75] Inventors: Bruce D. Kocer, Oxford; James P. O'Connor, Sylvan Lake; Hans Otto Bihrer, Canton, all of Mich.

[73] Assignee: The Budd Company, Troy, Mich.

[21] Appl. No.: 09/074,922

[22] Filed: May 8, 1998

Related U.S. Application Data

[60] Provisional application No. 60/078,698, Mar. 20, 1998.

[51] Int. Cl.⁷ ............................. B21D 26/02; B21D 28/28
[52] U.S. Cl. ........................................ 72/55; 72/58; 72/61
[58] Field of Search .................................. 72/55, 56, 61, 72/57, 58; 29/897.2, 421.1

[56] References Cited

U.S. PATENT DOCUMENTS

| | | |
|---|---|---|
| 1,000,574 | 8/1911 | Bauroth . |
| 1,886,831 | 11/1932 | Murray . |
| 1,926,353 | 9/1933 | Spatta . |
| 2,203,868 | 6/1940 | Gray et al. . |
| 2,205,893 | 6/1940 | Unger . |
| 3,273,916 | 9/1966 | Tillery . |
| 3,350,905 | 11/1967 | Ogura et al. . |
| 3,358,489 | 12/1967 | Hutchins . |
| 3,564,886 | 2/1971 | Nakamura . |
| 3,583,188 | 6/1971 | Nakamura . |
| 3,630,056 | 12/1971 | Cuq . |

(List continued on next page.)

FOREIGN PATENT DOCUMENTS

| | | |
|---|---|---|
| 1055236 | 5/1979 | Canada . |
| 0 036 365 A1 | 3/1981 | European Pat. Off. . |
| 0 372 360 A2 | 6/1990 | European Pat. Off. . |
| 0 588 528 A1 | 3/1994 | European Pat. Off. . |
| 0 650 860 A1 | 10/1994 | European Pat. Off. . |
| 0 683 305 A2 | 11/1995 | European Pat. Off. . |
| 0 686 440 A1 | 12/1995 | European Pat. Off. . |
| 0 742 057 A2 | 11/1996 | European Pat. Off. . |
| 0 758 565 A1 | 2/1997 | European Pat. Off. . |
| 0 770 435 A1 | 5/1997 | European Pat. Off. . |
| 0 742 057 A3 | 7/1997 | European Pat. Off. . |
| 0 913 277 A1 | 5/1999 | European Pat. Off. . |

(List continued on next page.)

OTHER PUBLICATIONS

Dohmann/Klass, "Methods of Tube Forming", *Strips Sheets Tubes*, (Mar. 1986), pp. 39–41.
Sawyer, Christoper A., "Hydro–Forming is Hot", *Automotive Industries*, (Jun., 1991), pp. 49, 51.
Mason, Murray, "Hydroform Tubes for Automotive Body Structure Applications", *SAE Technical Paper Series*, Series No. 930575, (May, 1993), pp. 59–64.
Pennington, J. Neiland, "Hydroforming: More part for less cost in GM luxury/performance cars", *Modern Metals*, (Oct., 1994), pp. 36, 38, 40–41.
"Hyprotec Delivery to North America Completed", *Hyprotec–News*, (1995), pp. 1–4.
"The Modular IHP Plant System", *H&B Hyprotec Technologie oHG*, (Jan., 1995).
Christensen, William L., "Hydroforming of Tubular Sections", *MetalForming*, (Oct., 1995), pp. 36–38, 40, 43.
Prof. Dr.–Ing. Kurt Lange, a German publication entitled *Industrie–Anzeiger*, (10 Mai 1996), pp. 107–110; 17 Juni 1966) pp. 137–140 (translation unavailable).

*Primary Examiner*—David Jones
*Attorney, Agent, or Firm*—Harness, Dickey & Pierce, P.L.C.

[57] ABSTRACT

A hydroformed control arm for a vehicle and a method of making the same is provided. The control arm includes a generally U-shaped member being hydroformed from a continuous, unitary tube. The generally U-shaped member includes varying cross-sectional areas along its length for improved structural integrity. The generally U-shaped member further includes a pair of pivot bores for enabling the control arm to pivot about a pivot axis. The U-shaped member still further including a ball joint cavity disposed near its apex for receiving a ball joint. The hydroformed control arm thereby eliminates the need for a ball joint bushing.

14 Claims, 6 Drawing Sheets

6,098,437

Page 2

U.S. PATENT DOCUMENTS

| | | |
|---|---|---|
| 3,672,194 | 6/1972 | Martin . |
| 3,685,327 | 8/1972 | Nakamura . |
| 3,798,943 | 3/1974 | Benteler et al. . |
| 3,914,969 | 10/1975 | Banks . |
| 4,179,910 | 12/1979 | Mazier . |
| 4,237,713 | 12/1980 | Benteler et al. . |
| 4,267,718 | 5/1981 | Benteler et al. . |
| 4,317,348 | 3/1982 | Halene et al. . |
| 4,319,471 | 3/1982 | Benteler et al. . |
| 4,354,369 | 10/1982 | Hamilton . |
| 4,437,326 | 3/1984 | Carlson . |
| 4,567,743 | 2/1986 | Cudini . |
| 4,595,077 | 6/1986 | Buttgereit . |
| 4,619,129 | 10/1986 | Petkov et al. . |
| 4,751,835 | 6/1988 | Galaniuk et al. . |
| 4,761,982 | 8/1988 | Snyder . |
| 4,763,503 | 8/1988 | Hughes et al. . |
| 4,782,679 | 11/1988 | Bogel . |
| 4,901,552 | 2/1990 | Ginty et al. . |
| 4,936,128 | 6/1990 | Story et al. . |
| 4,951,492 | 8/1990 | Vogt . |
| 5,107,693 | 4/1992 | Olszewski et al. . |
| 5,157,969 | 10/1992 | Roper . |
| 5,170,557 | 12/1992 | Rigsby . |
| 5,205,187 | 4/1993 | Ebbinghaus . |
| 5,233,854 | 8/1993 | Bowman et al. . |
| 5,233,856 | 8/1993 | Shimanovski et al. . |
| 5,239,852 | 8/1993 | Roper . |
| 5,259,268 | 11/1993 | Ebbinghaus et al. . |
| 5,279,142 | 1/1994 | Kaiser . |
| 5,303,570 | 4/1994 | Kaiser . |
| 5,320,331 | 6/1994 | Hellman, Sr. . |
| 5,321,964 | 6/1994 | Shimanovski et al. . |
| 5,333,775 | 8/1994 | Bruggemann et al. . |
| 5,339,667 | 8/1994 | Shah et al. . |
| 5,353,618 | 10/1994 | Roper et al. . |
| 5,363,544 | 11/1994 | Wells et al. . |
| 5,372,026 | 12/1994 | Roper . |
| 5,372,027 | 12/1994 | Roper et al. . |
| 5,398,533 | 3/1995 | Shimanovski et al. . |
| 5,415,021 | 5/1995 | Folmer . |
| 5,419,791 | 5/1995 | Folmer . |
| 5,431,326 | 7/1995 | Ni et al. . |
| 5,435,163 | 7/1995 | Schäfer . |
| 5,435,205 | 7/1995 | Seksaria et al. . |
| 5,445,001 | 8/1995 | Snavely . |
| 5,460,026 | 10/1995 | Schäfer . |
| 5,460,773 | 10/1995 | Fritz et al. . |
| 5,466,146 | 11/1995 | Fritz et al. . |
| 5,471,857 | 12/1995 | Dickerson . |
| 5,475,911 | 12/1995 | Wells et al. . |
| 5,481,892 | 1/1996 | Roper et al. . |
| 5,485,737 | 1/1996 | Dickerson . |
| 5,533,372 | 7/1996 | Roper et al. . |
| 5,545,026 | 8/1996 | Fritz et al. . |
| 5,553,474 | 9/1996 | Nokajima et al. . |
| 5,557,961 | 9/1996 | Ni et al. . |
| 5,561,902 | 10/1996 | Jacobs et al. . |
| 5,564,785 | 10/1996 | Schultz et al. . |
| 5,582,052 | 12/1996 | Rigsby . |
| 5,600,983 | 2/1997 | Rigsby . |
| 5,630,334 | 5/1997 | Ash . |
| 5,632,508 | 5/1997 | Jacobs et al. . |
| 5,641,176 | 6/1997 | Alatalo . |
| 5,662,349 | 9/1997 | Hasshi et al. . |
| 5,666,840 | 9/1997 | Shah et al. . |
| 5,673,470 | 10/1997 | Dehlinger et al. . |
| 5,673,929 | 10/1997 | Alatalo . |
| 5,715,718 | 2/1998 | Rigsby et al. . |
| 5,718,048 | 2/1998 | Horton et al. . |
| 5,720,092 | 2/1998 | Ni et al. . |
| 5,775,153 | 7/1998 | Rigsby et al. . |
| 5,799,524 | 9/1998 | Schafer et al. . |
| 5,813,266 | 9/1998 | Ash . |
| 5,815,901 | 10/1998 | Mason et al. . |
| 5,816,089 | 10/1998 | Marando . |
| 5,836,065 | 11/1998 | Dehlinger et al. . |
| 5,845,382 | 12/1998 | Schultz et al. . |
| 5,855,394 | 1/1999 | Horton et al. . |
| 5,857,897 | 1/1999 | Krcek et al. . |
| 5,862,877 | 1/1999 | Horton et al. . |
| 5,882,039 | 3/1999 | Beckman et al. . |
| 5,884,722 | 3/1999 | Durand et al. . |
| 5,899,498 | 5/1999 | Horton . |
| 5,918,494 | 7/1999 | Kojima et al. . |
| 5,927,120 | 7/1999 | Marando . |
| 5,932,167 | 8/1999 | Fritz et al. . |
| 5,953,945 | 9/1999 | Horton . |
| 5,974,846 | 11/1999 | Ash . |
| 5,979,201 | 11/1999 | Horton et al. . |
| 5,987,950 | 11/1999 | Horton . |

FOREIGN PATENT DOCUMENTS

| | | |
|---|---|---|
| 610114 | 3/1935 | Germany . |
| 37-9318 | 7/1962 | Japan . |
| 38-19434 | 9/1963 | Japan . |
| 44-21969 | 9/1969 | Japan . |
| 56-17132 | 2/1981 | Japan . |
| 61-49735 | 3/1986 | Japan . |
| 385146 | 3/1965 | Switzerland . |
| 2 282 580 | 4/1995 | United Kingdom . |
| 2 291 382 | 1/1996 | United Kingdom . |
| 2 304 613 | 3/1997 | United Kingdom . |
| WO 98/08633 | 3/1998 | WIPO . |
| WO 98/46382 | 10/1998 | WIPO . |
| WO 99/03616 | 1/1999 | WIPO . |
| WO 99/17894 | 4/1999 | WIPO . |
| WO 99/20516 | 4/1999 | WIPO . |

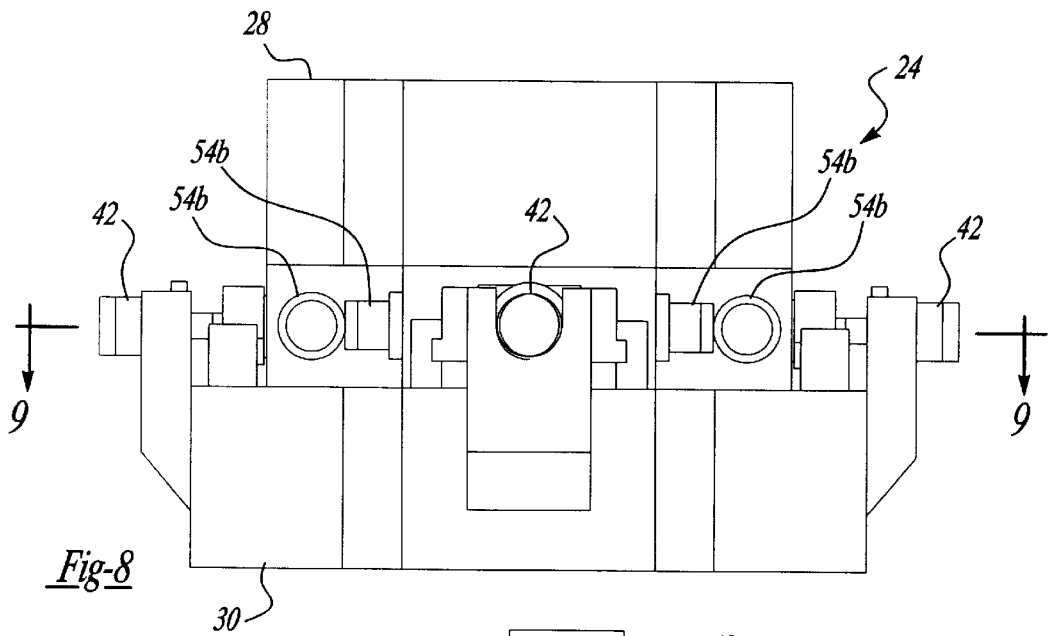
_Fig-8_
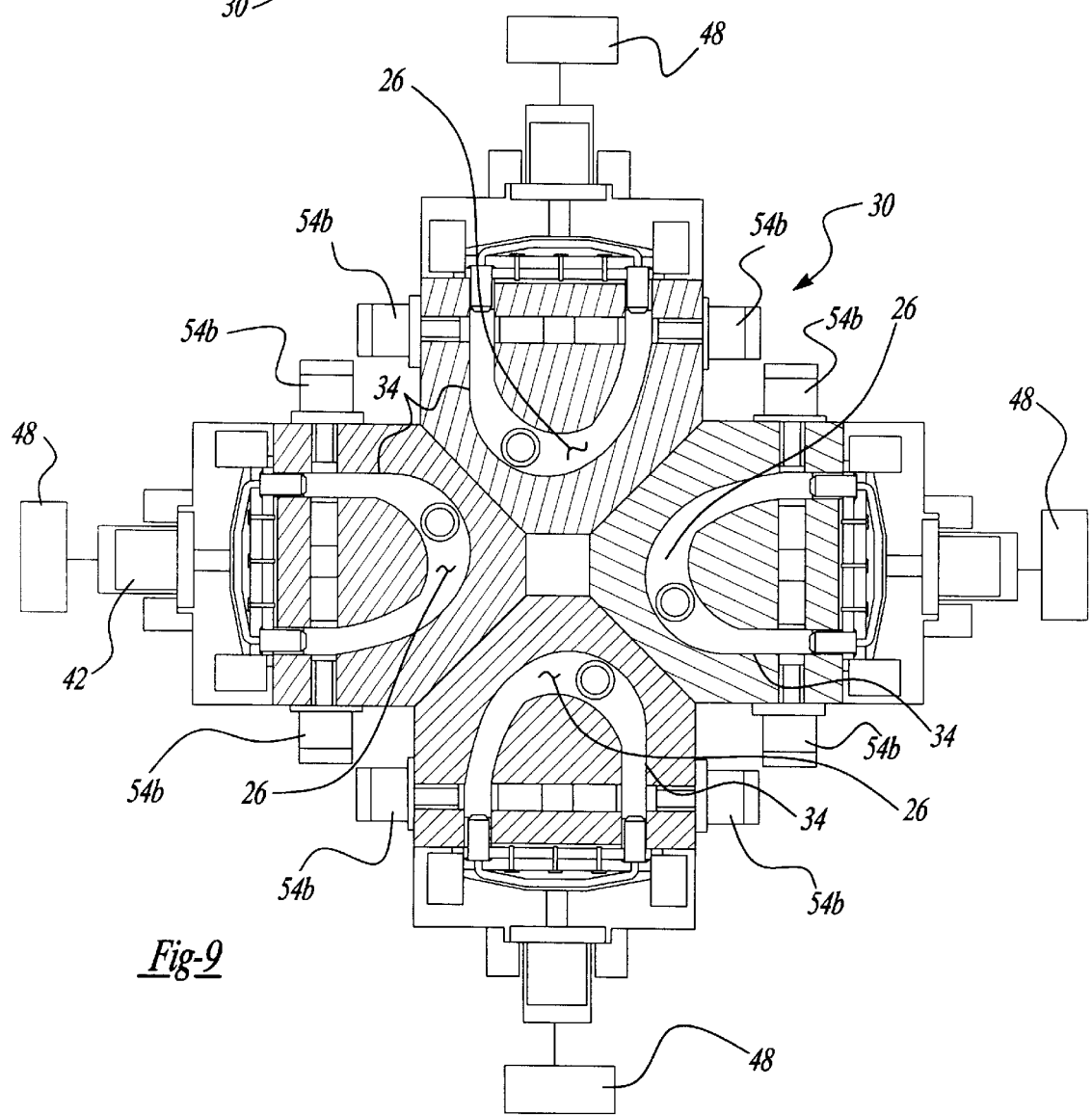
_Fig-9_

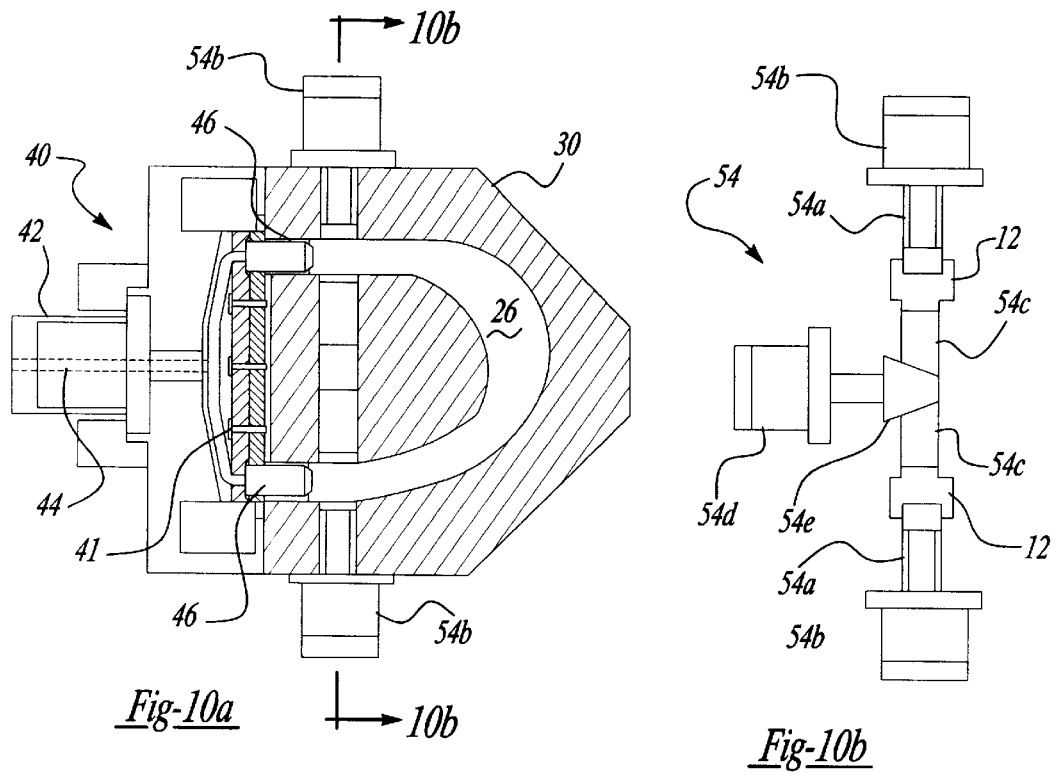
Fig-10a
Fig-10b
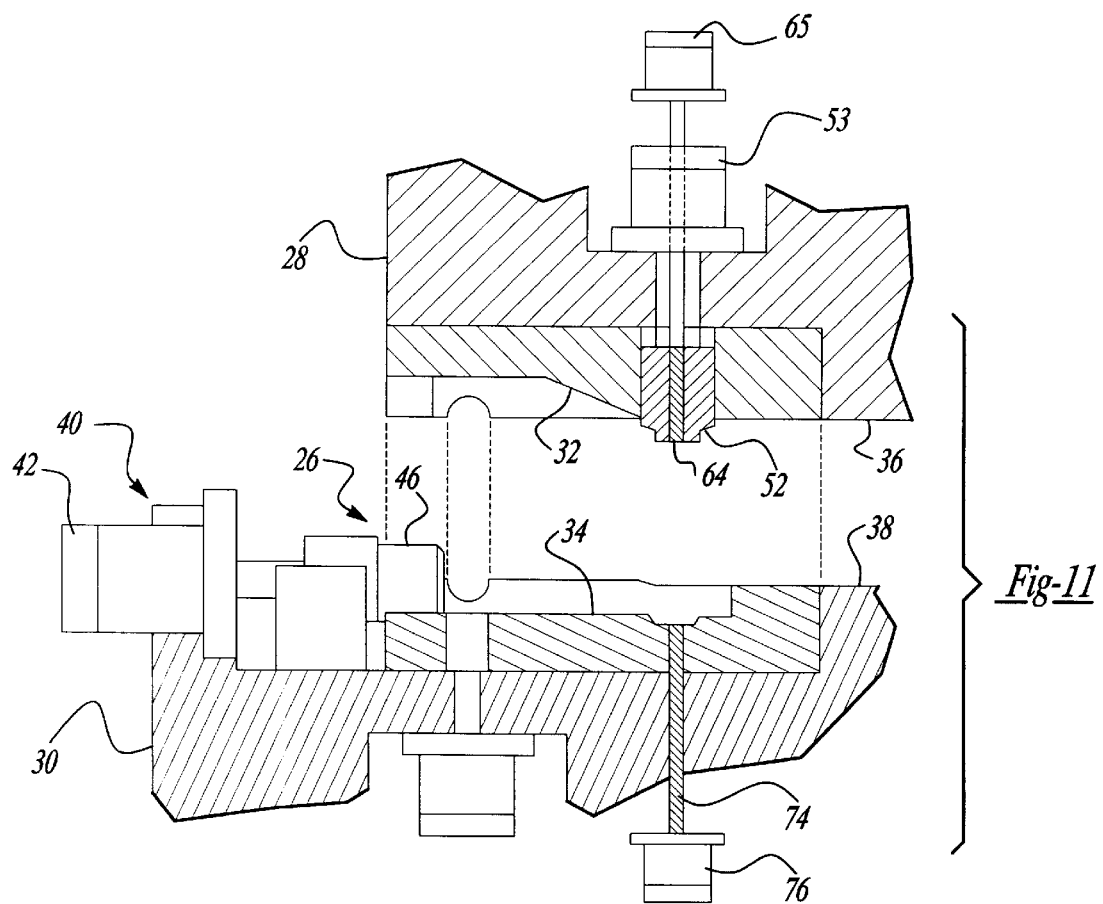
Fig-11

HYDROFORMED CONTROL ARM

CROSS-REFERENCE TO RELATED APPLICATIONS

This application is related to U.S. Pat. No. 6,006,568 entitled "MULTI-PIECE HYDROFORMING TOOL"; U.S. Pat. No. 5,992,197 entitled "FORMING TECHNIQUE USING DISCRETE HEATING ZONES"; and U.S. patent application Ser. No. 09/247,457 entitled "METHOD OF HYDROFORMING MULTI-LATERAL MEMBERS FROM ROUND TUBES," filed on Feb. 9, 1999.

This application claims benefit of Provisional Appl. Ser. No. 60/078,698 filed Mar. 20, 1998.

BACKGROUND OF THE INVENTION

1. Field of the Invention

The present invention relates to a control arm for a vehicle and, more particularly, to a control arm being hydroformed from a continuous, unitary tube and a method of making the same.

2. Background and Summary of the Invention

Control arms are commonly used in vehicle wheel suspension systems to provide a stable connection between multiple suspension components. A traditional control arm 100 is shown in FIG. 1, wherein control arm 100 is pivotally connected between the axle housing 102 and the vehicle chassis 104. The pivot connection allows for vertical displacement of the axle and wheel assembly. Traditional control arm 100 further includes a ball joint 106 pivotally coupled to a steering knuckle 108. Still further, traditional control arm 100 includes at least one rubber bushing 110 connected to the ball joint 106.

In operation, control arms must withstand extreme driving and braking torques created by the vehicle. To this end, it is necessary for control arms to be designed to maximize their structural integrity for improved tolerance of high vehicle loading forces caused by severe road damage, heavy braking, etc. It is also preferable for control arms to be designed to minimize the overall weight of the wheel suspension system.

As seen in FIG. 2, a cross-section of a typical control arm 112 is shown having a convoluted "hat-shaped" cross-section. Although the "hat-shaped" design is relatively simple to manufacture, it may not afford maximum structural integrity. Additionally, the hat-shaped design generally requires the use of bushing element 110 to properly receive ball joint 106. Consequently, the "hat-shaped" design often fails to provide an optimal system.

Another typical control arm 114 is shown in FIG. 3 having a two-piece stamped construction, wherein the pieces 116, 118 of the control arm are welded together. This design provides improved structural rigidity over the prior design shown in FIG. 2. However, like the prior design, the design shown in FIG. 3 requires the use of bushing element 110 to properly receive ball joint 106. Moreover, this design fails to minimize the overall weight of the system.

Accordingly, there exists a need in the relevant art to provide a vehicle control arm capable of maximizing the structural integrity of the suspension system. Furthermore, the vehicle control arm should preferably minimize the weight of the wheel suspension system. Still further, there exists a need in the relevant art to improve manufacturing methods to increase production, without compromising product reliability.

According to the broad teachings of this invention, a control arm having an advantageous construction and method of manufacture, preferably by hydroforming, is provided.

According to a preferred embodiment of the present invention, a vehicle control arm is provided having a unitary, hydroformed, U-shaped tube. The vehicle control arm includes suspension interconnection means interconnecting the hydroformed tube and the vehicle wheel suspension. The interconnection means eliminate the need for a separate bushing element to support the ball joint, as required in the prior methods discussed above. A pair of pivot bores are further provided in U-shaped member to enable the hydroformed control arm to pivot about a pivot axis.

The present invention further provides a method of manufacturing the hydroformed control arm. The method of the preferred embodiment includes the steps of: (a) providing a die having a tooling cavity; (b) enclosing a tube within the tooling cavity of the die; (c) applying fluid pressure to an interior of the tube, the fluid pressure causing the walls of the tube to expand to closely conform to the shape of the tooling cavity, thereby forming a control arm having unitary construction.

According to a more preferred method of manufacturing the hydroformed control arm, the die includes a stationary lower die member and a movable upper die member. The die members together define the tooling cavity. Furthermore, the step of enclosing the tube within the tooling cavity specifically includes bending a generally straight tube to form generally S-shaped bends therein. The tube is then cut to form a plurality of generally U-shaped tubes. The U-shaped tubes are then enclosed within the die for hydroforming.

According to a still more preferred method of manufacturing the hydroformed control arm, a cavity is formed in the control arm by first maintaining the internal fluid pressure within the control arm. A forming tool, which is operably interconnected with the die, is positioned in contact with the side of the control arm. The forming tool is then driven into the side of the control arm to form an indentation. By increasing the fluid pressure within the interior of the control arm, while leaving the forming tool in place, the walls of the control arm are forced against the forming tool to form the cavity.

According to an even more preferred method of manufacturing the hydroformed control arm, an aperture is formed through the bottom portion of the cavity to allow a ball joint to extend therethrough. The aperture is formed in the cavity by extending a piercing tool, which is slidably disposed within the forming tool, through the bottom portion of the cavity while the forming tool remains within the cavity.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 8 is a front view of a multi-piece hydroforming tool;

FIG. 9 is a cross-sectional view of FIG. 8, taken along line 9—9;

FIG. 10a is an exploded view, with portions in cross-section, of the multi-piece hydroforming tool;

FIG. 10b is a cross-sectional view of FIG. 10a, taken along line 10b—10b;

FIG. 11 is an exploded cross-sectional view of the multi-piece hydroforming tool in an opened position;

DETAILED DESCRIPTION OF THE PREFERRED EMBODIMENT

The following description of the preferred embodiment is merely exemplary in nature and is in no way intended to limit the invention, its application, or uses. For example, the techniques disclosed herein may have utility in forming a wide variety of different parts.

Figure 1:
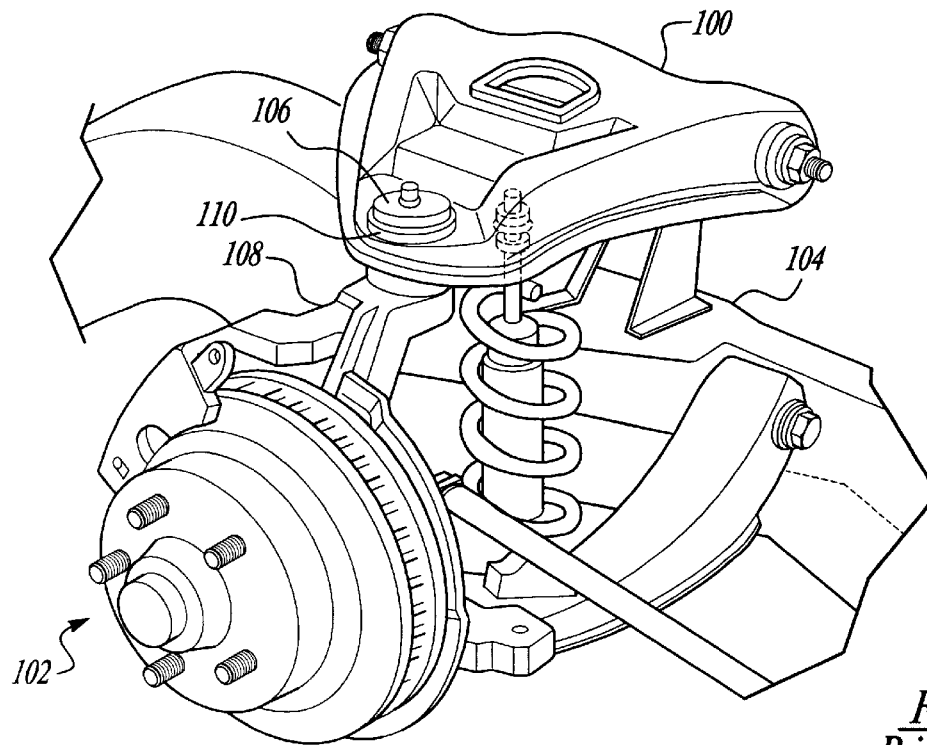
FIG. 1 is a perspective view of a wheel suspension system according to a prior art method of assembly.
Figure 2:
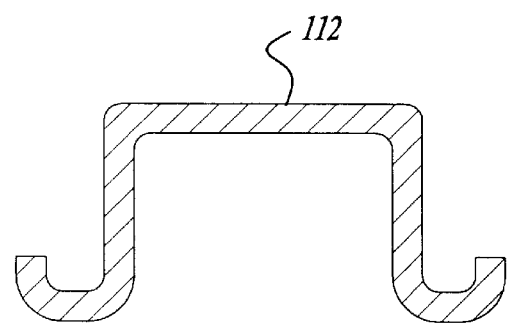
FIG. 2 is a partial cross-sectional view of a prior art vehicle control arm.
Figure 3:
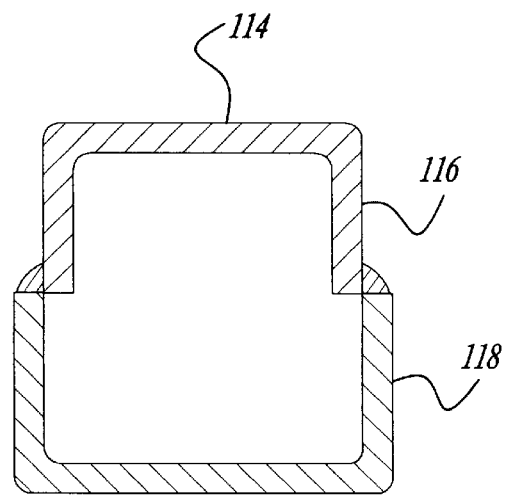
FIG. 3 is a partial cross-sectional view of another prior art vehicle control arm.
Figure 4:
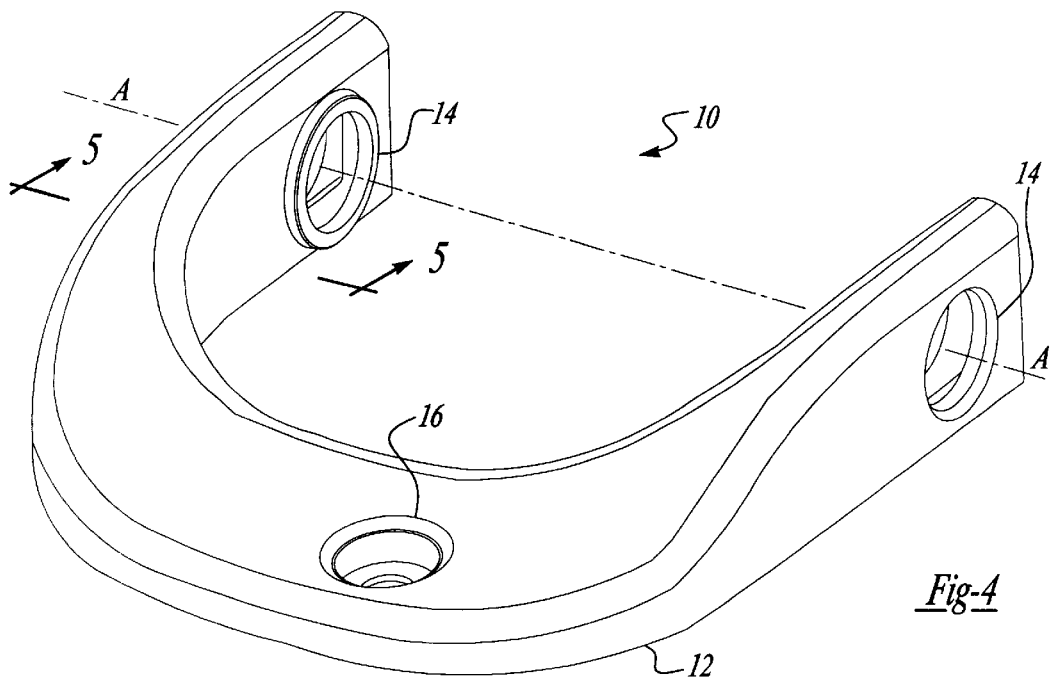
FIG. 4 is a perspective view of a hydroformed control arm.

Referring to the drawings, a hydroformed vehicle control arm 10, and a method of making the same, is provided having a generally U-shaped member 12. U-shaped member 12 is hydroformed from a single, constant-radius circular tube. As best seen in FIG. 4, hydroformed control arm 10 further includes a pair of pivot bores 14. Pivot bores 14 are disposed on each end of generally U-shaped member 12 to enable hydroformed control arm 10 to pivot about an axis "A". Hydroformed control arm 10 further includes a ball joint cavity 16. Ball joint cavity 16 is generally located at an apex of U-shaped member 12. As will be described, ball joint cavity 16 provides means for retaining a ball joint 18 (FIG. 17) therein, without the need of the additional bushing element 110. Ball joint 18 includes a base portion 18a and a threaded portion 18b to fixedly interconnect hydroformed control arm 10 and steering knuckle 108.

Figure 5:
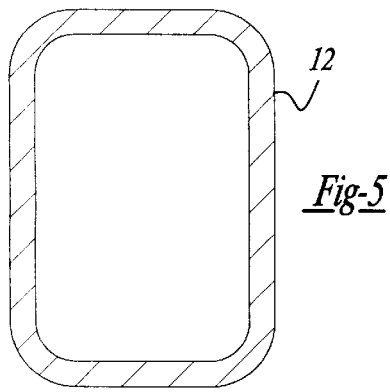
FIG. 5 is a cross-sectional view of FIG. 4, taken along line 5—5.

As can be appreciated from FIGS. 4 and 5, hydroformed control arm 10 is preferably formed with varying cross-sectional areas to provide optimal structural rigidity and performance. Furthermore, hydroformed control arm 10 is seamlessly constructed, thereby requiring no welding or stamping.

According to a preferred method of forming hydroformed control arm 10, a straight tube having uniform wall thickness is first provided (not shown). By way of non-limiting example, the tube is approximately three (3) feet in length, two (2) inches in diameter, made of Steel 1008-1010 having a wall thickness of one-tenth (0.1) inch. More preferably, the tube is welded with scarfed weld seams. Generally straight tubes are readily available in the marketplace to facilitate mass production of hydroformed control arm 10.

Figure 6:
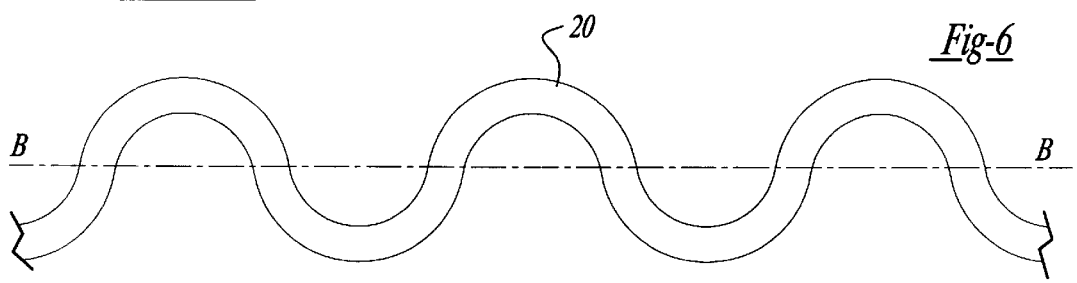
FIG. 6 is a top plan view of an elongated S-shaped constant-radius tube which is used as starting material to make the control arms.
Figure 7:
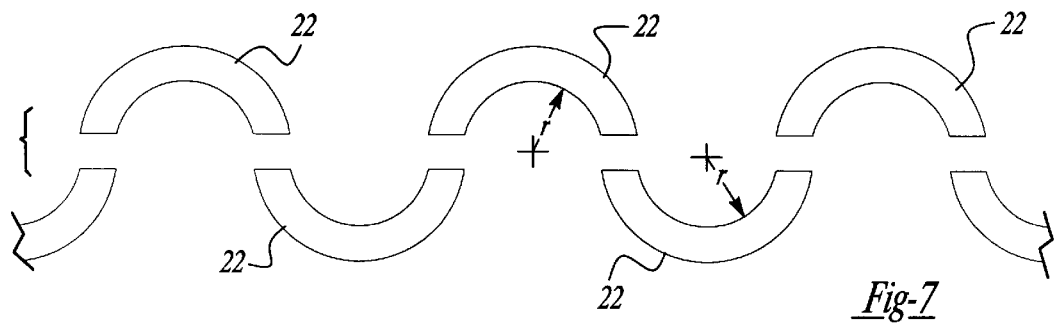
FIG. 7 is a top plan view of a plurality of U-shaped round tubes which have been cut from the tube of FIG. 6.
Figure 12:
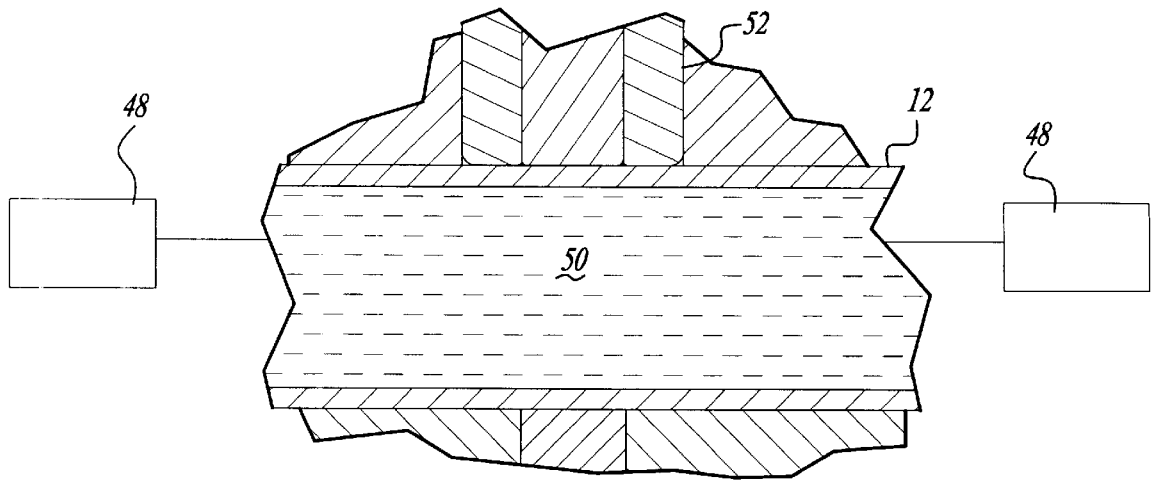
FIGS. 12–16 illustrate progressive steps in forming the ball joint cavity in the control arm.

During manufacture, the generally straight tube is bent along its length to form a tube 20 having generally serpentine or S-shaped bends. Mandrels are preferably used during the bending process, if the combination of the tube wall thickness, tube material and bending radius is likely to cause wrinkling in S-shaped tube 20. S-shaped tube 20 is then cut along a center line "B" to form a plurality of generally U-shaped tubes 22, each tube having a constant radius "r", as seen in FIGS. 6 and 7.

Referring to FIGS. 8 through 11, a multi-piece hydroforming tool 24 is shown having preferably four U-shaped cavities 26 disposed therein. As best seen in FIG. 8, multi-piece hydroforming tool 24 includes an upper die member 28 and a lower die member 30. Upper die member 28 and lower die member 30 include opposed surfaces 32, 34, respectively. As best seen in FIG. 11, opposed surface 32 is disposed in a bottom portion 36 of upper die member 28. Similarly, opposed surface 34 is disposed in a top portion 38 of lower die member 30. Opposed surfaces 32, 34 are aligned and spaced to define U-shaped cavity 26 when bottom portion 36 of upper die member 28 contacts top portion 38 of lower die member 30.

Referring to FIGS. 10a, and 11, multi-piece hydroforming tool 24 further includes an injector manifold 40 secured to each U-shaped cavity 26 using a plurality of pre-stretched fasteners 41. Injector manifold 40 delivers pressurized hydraulic fluid to U-shaped cavity 26. Specifically, injector manifold 40 includes an inlet port 42 and a fluid aperture 44 extending through a pair of fluid nozzles 46. Fluid aperture 44 defines fluid communication means between inlet port 42 and generally U-shaped cavity 26.

As shown in FIG. 9, multi-piece hydroforming tool 24 still further includes a hydraulic pressure source 48 in fluid communication with inlet port 42. Hydraulic pressure source 48 provides hydraulic fluid 50 (FIGS. 12–16) under extreme pressure, typically in the range of 15,000 psi to 90,000 psi, to each inlet port 42.

Turning to FIG. 11, multi-piece hydroforming tool 24 includes a plurality of forming tools 52 provided in upper die member 28 of multipiece hydroforming tool 24. Each U-shaped cavity 26 includes at least one forming tool 52 and corresponding forming cylinder 53 for forming ball joint cavity 16 in hydroformed control arm 10.

As best seen in FIGS. 9, 10a, and 10b, multi-piece hydroforming tool 24 further includes an extruding device 54 for extruding pivot bores 14 in hydroformed control arm 10. Specifically, each extruding device 54 includes a pair of outer extruding tools 54a preferably disposed orthogonal to the ends of U-shaped cavity 26. Each outer extruding tool 54a is operably connected to corresponding outer extruding cylinder 54b. In operation, outer extruding cylinder 54b drives outer extruding tool 54a into the sides of U-shaped tube 12, thereby forming an outer pivot bore depression. Similarly, each extruding device 54 further includes a pair of inner extruding tools 54c preferably disposed orthogonal to the ends of U-shaped cavity 26 and further disposed coaxially oriented relative to outer extruding tools 54a. Inner extruding tools 54c are operably connected to a single inner extruding cylinder 54d. In operation, inner pivot bore depressions are formed by retracting an inner extruding ram 54e using inner extruding cylinder 54d, thereby retracting inner extruding tools 54c. Internal hydraulic pressure within U-shaped tube 12 causes a pair of inner pivot bore depression to be formed. After hydroforming, pivot bores 14 are formed by preferably drilling through inner and outer pivot bore depressions. However, it is anticipated that pivot bores 14 may also be formed by cutting or boring depending on tolerance requirements.

During operation of multi-piece hydroforming tool 24, upper die member 28 is preferably moved from a closed position to an opened position. Generally U-shaped round tubes 22 are then placed in generally U-shaped cavities 26 of multi-piece hydroforming tool 24. Generally U-shaped round tubes 22 are oriented such that the ends of generally U-shaped round tube 22 extend outward from U-shaped cavities 26. Upper die member 28 is then moved to a closed position. A closed position is defined as the point when bottom portion 36 of upper die member 28 contacts top portion 38 of lower die member 30. Injector manifolds 42 are then positioned to deliver pressurized hydraulic fluid 50 to U-shaped cavities 26. Specifically, injector manifolds 42 are retained in multi-piece hydroforming tool 24 using a plurality of pre-scretched fasteners (not shown). The pre-scretched fasteners are preferably attached to lower die member 30, thereby offsetting the hydroforming fluid pressure. A pair of fluid nozzles 46 of injector manifold 42 are in fluid communication with the opened ends of generally U-shaped round tube 22, thereby creating a fluid seal between fluid nozzle 46 and the ends of U-shaped round tube 22.

Referring to FIG. 9, hydraulic pressure source 48 forces hydraulic fluid 50 into an interior volume of generally U-shaped round tube 22 such that U-shaped round tube 22 expands to closely conform to the shape of opposed surfaces 32, 34 of U-shaped cavity 26. This technique is known as hydroforming.

Figure 13:
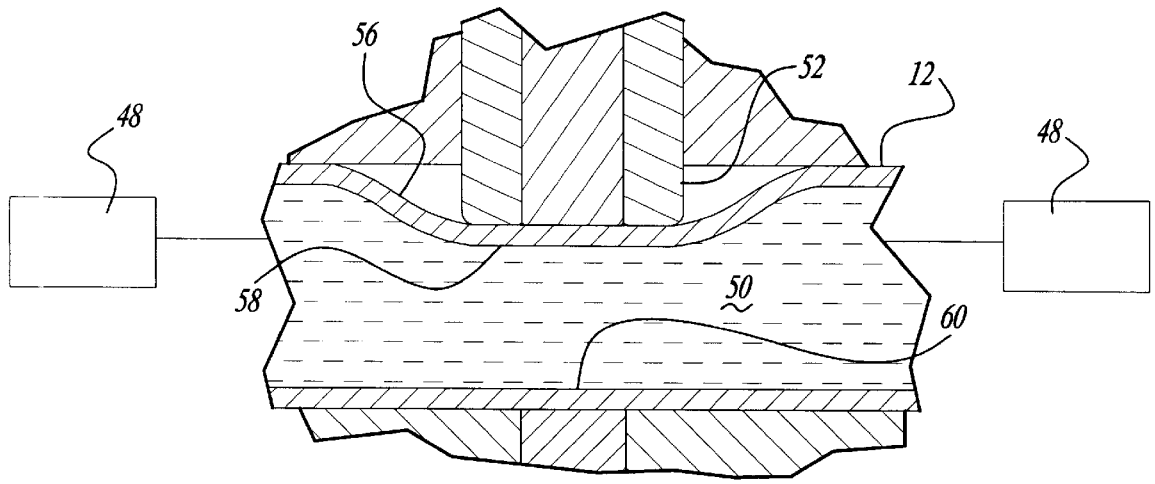
Figure 14:
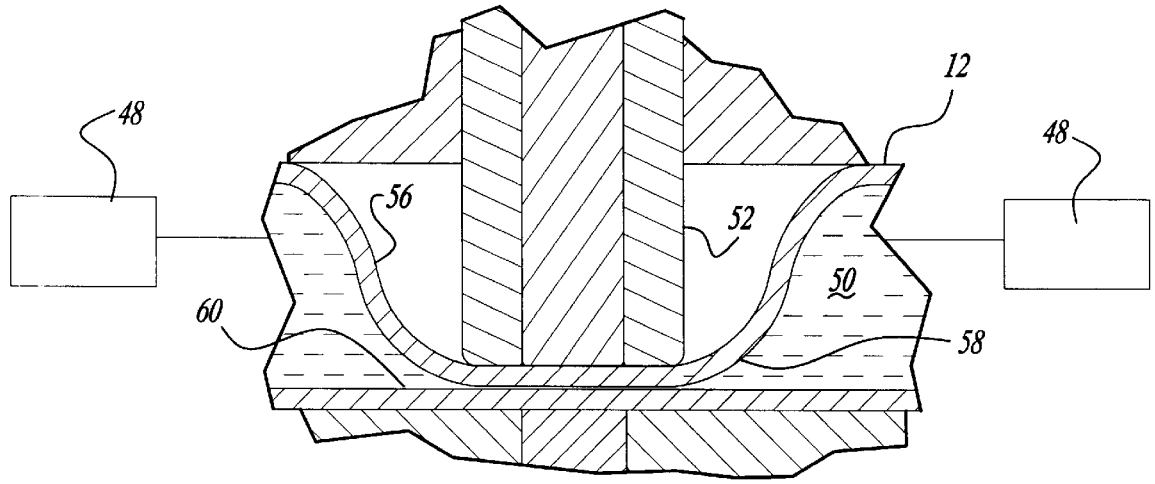

Referring to FIGS. 12 through 16, a method of forming ball joint cavity 16 in hydroformed control arm 10 is provided. As seen in FIG. 11 and as noted above, hydraulic pressure source 48 provides hydraulic fluid 50 at extreme pressure so as to expand U-shaped round tube 22 to conform with opposed surfaces 32, 34 of multi-piece hydroforming tool 24. As best seen in FIG. 13, forming tool 52 extends from opposed surface 32 of upper die member 28 and applies pressure to form a generally sloping depression 56 in hydroformed control arm 10. This step allows uniform stretching of the material of hydroformed control arm 10. The uniform stretching of the material minimizes possible stress fractures formed during manufacture. Forming tool 52 continues to form sloping depression 56 until a first interior wall 58 of hydroformed control arm 10 contacts an opposing second interior wall 60. The contact prevents further movement of forming tool 52.

Figure 15:
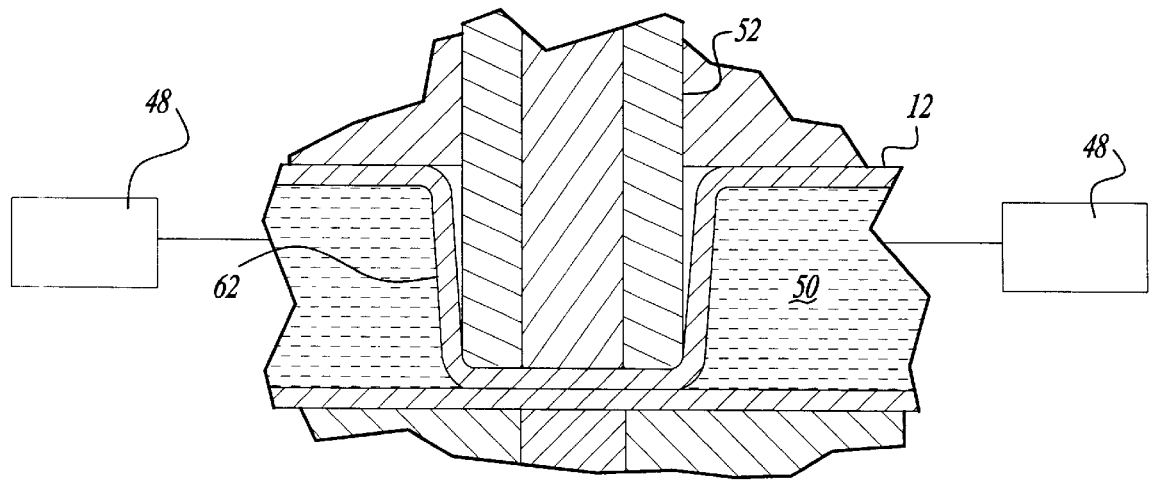
Figure 16:
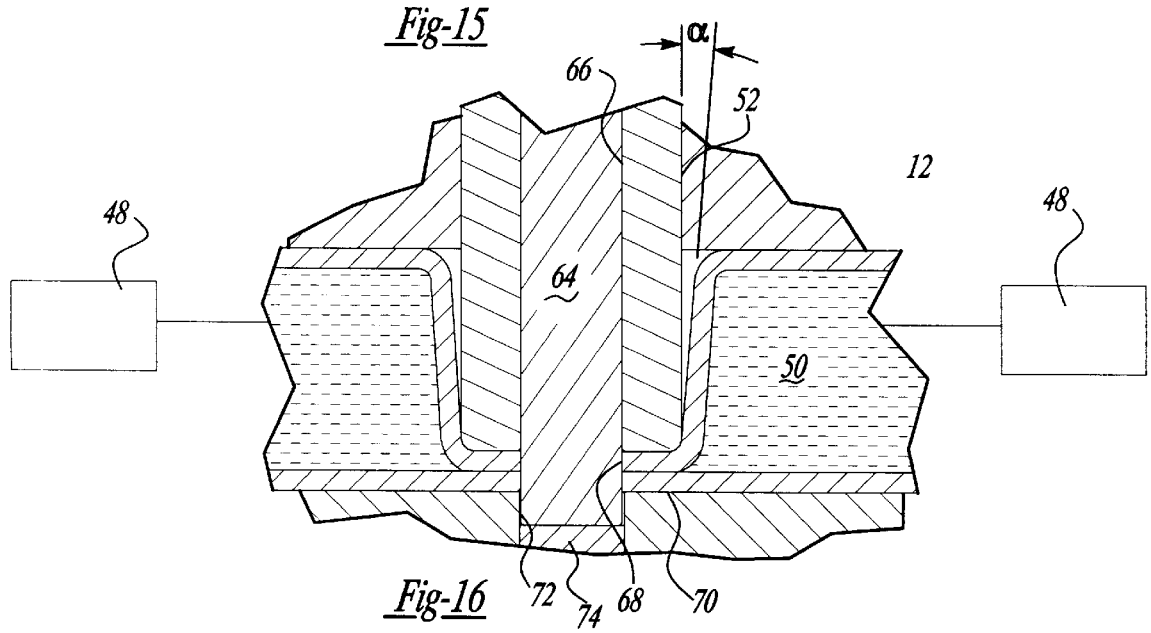

As best seen in FIG. 15, once forming tool 52 has completely formed sloping depression 56, the pressure of hydraulic fluid 50 is increased to force the walls of the tube defining sloping depression 56 to generally conform to the shape of forming tool 52. Generally vertical walls 62 of ball joint cavity 16 are thereby formed. As can be appreciated from FIG. 15, generally vertical wall 62 include a draft angle "α" to allow for improved tooling of hydroformed control arm 10.

Without intending to be limited by example, a draft angle of approximately three to four degrees (3–4°) from vertical has been found to be sufficient.

Referring to FIGS. 11–16, a piercing tool 64 is shown as being slidably received within a bore 66 of each forming tool 52. Piercing tool 64 is further shown operably connected to a mechanical device or piercing cylinder 65. Piercing tool 64 creates an aperture 68 in a bottom portion 70 of ball joint cavity 16. Specifically, piercing cylinder 65 forces piercing tool 64 through first interior wall 58 and second interior wall 60 while forming tool 52 remains in ball joint cavity 16. During the piercing process, piercing tool 64 is received within a corresponding receiving chamber 72 of lower die member 30. Receiving chamber 72 is created by retracting a receiving tool 74 using a receiving tool cylinder 76. This method enables opposed surface 34 to remain flat during hydroforming of U-shaped member 12, yet accommodate an end of piercing tool 64 during the piercing operation. A completed hydroformed control arm 10 is then removed from generally U-shaped cavity 26 of multi-piece hydroforming tool 24.

Figure 17:
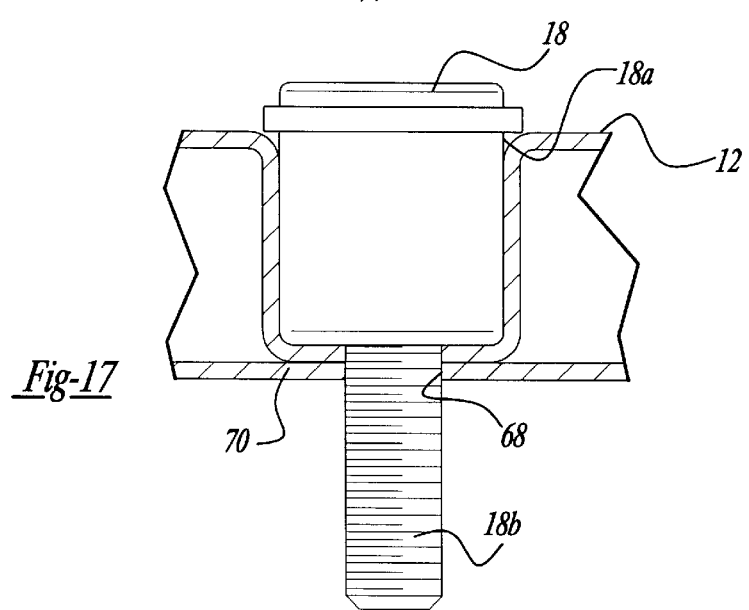
FIG. 17 is a cross-sectional view of the hydroformed control arm having a ball joint disposed in the ball joint cavity of the control arm.

Referring to FIG. 17, ball joint 18 is shown disposed in ball joint cavity 16 of hydroformed control arm 10. Preferably, the outer diameter of ball joint 18 is greater than the inner diameter of ball joint cavity 16, thereby creating a press fit connection between ball joint 18 and ball joint cavity 16. The press fit connection eliminates the need to provide the additional bushing element 110 disposed between hydroformed control arm 10 and the ball joint 18 of the prior art constructions discussed above.

It should be appreciated that the multi-piece hydroforming tool of the present invention enables multiple control arms to be hydroformed simultaneously. However, unlike the prior art method, the present invention hydroforms multiple control arms independently in a single die. This method of hydroforming minimizes the need to discard all of the hydroformed control arms if one hydroformed control arm is found to be defective. Furthermore, it should be appreciated that unlike the prior art methods of making a control arm, the present inventions provides a continuous, unitary hydroformed control arm. The unitary construction of the control arm is believed to improve the structural integrity of the control arm, thereby providing a more optimal design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of hydroforming a control arm of a vehicle, said method comprising the steps of:

providing a die having a tooling cavity;

enclosing a tube within said tooling cavity of said die;

applying fluid pressure to an interior of said tube, said fluid pressure causing the walls of said tube to expand to closely conform to the shape of said tooling cavity, thereby forming a control arm having unitary construction;

providing a forming tool being operably interconnected with said die for forming a cavity in the control arm;

positioning said forming tool in contact with a side of the control arm;

driving said forming tool into said side of the control arm thereby forming an indentation therein; and increasing said fluid pressure within said interior of the control arm while leaving said forming tool in place such that said fluid pressure forces the walls of the control arm to closely conform to the shape of said forming tool thereby forming said cavity therein.

2. The method according to claim 1 wherein said die further includes upper and lower die members, at least one of said die members being movable between opened and closed positions, said upper and lower die members together define said tooling cavity.

3. The method according to claim 2 wherein the step of enclosing a tube within said tooling cavity of said die includes the steps of:

providing a generally straight tube;

bending said tube to form generally S-shaped bends therein;

cutting said tube to form a plurality of individual generally U-shaped tubes;

moving said movable die member into said opened position;

placing said U-shaped tube within said tooling cavity of said die; and moving said movable die member into said closed position, thereby retaining and enclosing said U-shaped tube within said tooling cavity of said die.

4. The method according to claim 3, further comprising:

providing a piercing tool slidably disposed within said forming tool for piercing an aperture through a bottom portion of said cavity of the control arm; and extending said piercing tool through said bottom portion of said cavity while said forming tool remains within said cavity, thereby forming said aperture through said bottom portion of said cavity.

5. The method according to claim 4, further comprising:

providing a ball joint having a base portion and a threaded portion; and disposing said base portion of said ball joint within said cavity of the control arm, thereby extending said threaded portion through said aperture of said cavity.

6. The method according to claim 5 wherein an outer diameter of said ball joint is greater than an inner diameter of said cavity of the control arm and wherein said ball joint is pressed into said cavity of the control arm such that said ball joint is frictionally retained within said cavity of the control arm.

7. The method according to claim 1 wherein said die includes a plurality of generally U-shaped cavities for forming a plurality of control arms independently.

8. A method of hydroforming a control arm of a vehicle comprising:

providing a continuous tube;

disposing said continuous tube within a die cavity of a hydroforming die;

applying fluid pressure within said continuous tube to force said continuous tube to closely conform to said die cavity;

driving a forming tool into a side of said continuous tube to form a sloping depression in said continuous tube; and increasing said fluid pressure within said continuous tube without retracting said forming tool such that said fluid pressure forces said side of said continuous tube to substantially conform to the shape of said forming tool, thereby forming a joint cavity.

9. The method according to claim 8 wherein said providing a continuous tube includes:

providing a generally straight continuous tube;

bending said tube to form generally S-shaped bends therein; and cutting said tube to form a plurality of individual generally U-shaped continuous tubes.

10. The method according to claim 8, further comprising:

piercing an aperture through a bottom portion of said joint cavity.

11. The method according to claim 10 wherein said piercing an aperture through a bottom portion of said joint cavity is performed while said continuous tube is disposed in said hydroforming die.

12. A method of hydroforming a control arm of a vehicle comprising:

providing a generally straight continuous tube;

bending said tube to form generally S-shaped bends therein;

cutting said tube to form a plurality of individual generally U-shaped continuous tubes;

disposing said U-shaped tube within a die cavity of a hydroforming die;

applying fluid pressure within said U-shaped tube to force said U-shaped tube to closely conform to said die cavity;

driving a forming tool into a side of said U-shaped tube to form a sloping depression in said U-shaped tube; and increasing said fluid pressure within said U-shaped tube without retracting said forming tool such that said fluid pressure forces said side of said U-shaped tube to substantially conform to the shape of said forming tool, thereby forming a joint cavity.

13. The method according to claim 12, further comprising:

piercing an aperture through a bottom portion of said joint cavity.

14. The method according to claim 13 wherein said piercing an aperture through a bottom portion of said joint cavity is performed while said continuous tube is disposed in said hydroforming die.

* * * * *